US012560802B2

(12) United States Patent
Schatz et al.

(10) Patent No.: US 12,560,802 B2
(45) Date of Patent: Feb. 24, 2026

(54) MICROMECHANICAL VIBRATION SYSTEM

(71) Applicant: Robert Bosch GmbH, Stuttgart (DE)

(72) Inventors: Frank Schatz, Kornwestheim (DE);
Helmut Grutzeck, Kusterdingen (DE);
Josip Mihaljevic, Holzgerlingen (DE);
Timo Schary, Aichtal-Neuenhaus (DE)

(73) Assignee: ROBERT BOSCH GMBH, Stuttgart (DE)

( * ) Notice: Subject to any disclaimer, the term of this patent is extended or adjusted under 35 U.S.C. 154(b) by 364 days.

(21) Appl. No.: 18/309,643

(22) Filed: Apr. 28, 2023

(65) Prior Publication Data

US 2023/0375824 A1      Nov. 23, 2023

(30) Foreign Application Priority Data

May 18, 2022    (DE) ..................... 10 2022 204 947.0

(51) Int. Cl.
G02B 26/08          (2006.01)
G02B 1/02          (2006.01)
(52) U.S. Cl.
CPC .............. G02B 26/085 (2013.01); G02B 1/02 (2013.01)
(58) Field of Classification Search
CPC .................................................... G02B 26/085
See application file for complete search history.

(56) References Cited

U.S. PATENT DOCUMENTS

| | | | | |
|---|---|---|---|---|
| 6,122,089 | A | * | 9/2000 | Minamoto ........... G02B 26/085 359/223.1 |
| 2005/0122602 | A1 | | 6/2005 | Kamiya et al. |
| 2014/0185117 | A1 | | 7/2014 | Hino |
| 2015/0288268 | A1 | * | 10/2015 | Gamet ............... G02B 26/0833 310/38 |
| 2016/0124214 | A1 | | 5/2016 | Freedman et al. |
| 2018/0226870 | A1 | | 8/2018 | Gamet et al. |

* cited by examiner

*Primary Examiner* — James A Dudek
(74) *Attorney, Agent, or Firm* — NORTON ROSE FULBRIGHT US LLP

(57) ABSTRACT

A micromechanical vibration system. The system includes a micromechanical vibrating body with at least one micromirror. The micromirror extends in a first main extension plane and has a face reflective to incident light. The system further includes an electromagnetic drive unit comprising a coil body and at least two magnets. The coil body is arranged in a second main extension plane parallel to the first main extension plane. The coil body is arranged laterally and/or on a side opposite the reflective face of the micromirror and/or on a side facing the reflective face of the micromirror. The at least two magnets extend in a third main extension plane of the coil body parallel to the first and second main extension plane and are arranged on the side opposite the reflective face of the micromirror. A single first magnetic flux plate is arranged in an intermediate space between the magnets.

13 Claims, 4 Drawing Sheets

Start arrange coil body relative to
micromechanical vibrating body — 100 arrange at least two magnets
in a third plane of extension — 110 arrange magnetic flux plate
between the magnets — 120

End

MICROMECHANICAL VIBRATION SYSTEM

CROSS REFERENCE

The present application claims the benefit under 35 U.S.C. § 119 of German Patent Application No. DE 10 2022 204 947.0 filed on May 18, 2022, which is expressly incorporated herein by reference in its entirety.

FIELD

The present invention relates to a micromechanical vibration system, in particular to a micromirror arrangement, and to a microprojection device comprising a micromechanical vibration system.

BACKGROUND INFORMATION

U.S. Patent Application Publication No. US 2014/0185117 A1 shows a micromirror arrangement in which two magnets, as the electromagnetic drive unit of the micromirror arrangement, are arranged laterally to a coil.

An object of the present invention is to develop an alternative electromagnetic drive unit for a micromechanical vibration system, wherein the assembly of the at least two magnets is in particular simplified.

SUMMARY

The present invention provides a micromechanical vibration system. A microprojection device and a method for producing a micromechanical vibration system are also provided.

According to an example embodiment of the present invention, a micromechanical vibration system, which is in particular designed as a micromirror arrangement, comprises a micromechanical vibrating body with at least one micromirror. In this context, the micromirror is in particular designed to perform a one-dimensional or two-dimensional rotation about a first and/or second rotation axis. For this rotation of the micromirror, the micromechanical vibration system additionally comprises an electromagnetic drive unit comprising a coil body and at least two magnets. The micromirror extends in a first main extension plane and comprises a face, in particular surface, reflective to incident light, in particular incident light generated by means of an illumination unit. The coil body of the electromagnetic drive unit is arranged in a second main extension plane parallel to the first main extension plane. In this second main extension plane, in particular in a plan view, the coil body is arranged laterally with respect to the micromirror. Alternatively or additionally, the coil body is arranged with respect to the micromirror on a side opposite the reflective face of the micromirror. Furthermore alternatively or additionally, the coil body is arranged with respect to the micromirror on a side facing the reflective face of the micromirror. The at least two magnets of the electromagnetic drive unit extend in a third main extension plane parallel to the first and second main extension planes. In this case, the at least two magnets are arranged on the side of the micromirror opposite the reflective face of the micromirror. The at least two magnets are arranged spaced apart, in particular completely spaced apart, from one another. A single first magnetic flux plate for guiding the magnetic field lines toward the coil body is arranged between the magnets, in particular in an intermediate space between the magnets. This means that no further magnetic flux plate and only the first magnetic flux plate is arranged between the magnets. Thus, an easy-to-manufacture micromechanical vibration system with a comparatively high driving force results. Preferably, soft-magnetic plates are used for such magnetic flux plates. Preferably, the magnetic flux plate at least partially shields the magnets from an external environment. The magnetic flux plate focuses the magnetic field onto the outer coil windings and generally increases the magnetic field. A first one of the at least two magnets of the electromagnetic drive unit preferably has a first magnetization direction. The second one of the at least two magnets preferably has a second magnetization direction opposite the first magnetization direction.

Preferably, according to an example embodiment of the present invention, the first magnetic flux plate additionally extends at least partially in a first partial extension plane parallel to the main extension planes. This first partial extension plane extends on the side of the micromirror opposite the reflective face of the micromirror. In particular, in a side view, the first partial extension plane extends below the at least two magnets. Preferably, the first magnetic flux plate is formed with edges having a radius of at most 250 µm. In this context, the first magnetic flux plate can simply be produced by a milling process or, alternatively, by an extrusion method. Alternatively, the micromechanical vibration system preferably additionally comprises a second magnetic flux plate, which extends in a fourth main extension plane parallel to the main extension planes. The fourth main extension plane extends on the side of the micromirror opposite the reflective face of the micromirror. The first magnetic flux plate is connected to the second magnetic flux plate in this case. The connection in particular takes place by means of an adhesive layer or a solder layer. Due to the possibility of using simple rectangular profiles, this results in high manufacturing precision without the need for a shaping process. Both the one-piece magnetic flux plate and the two-piece magnetic flux plate preferably have a T-shaped cross section overall.

Preferably, according to an example embodiment of the first magnetic flux plate has a recess in a side face arranged closest to the micromirror. This recess is in particular semi-circular.

Preferably, according to an example embodiment of the present invention, the first magnetic flux plate is at least partially curved. Preferably, the first magnetic flux plate has an Q-shaped cross section. This embodiment can be manufactured inexpensively from a flow guide plate, e.g., as a punched/drawn part, which is in particular advantageous in mass production.

Preferably, according to an example embodiment of the present invention, a first air gap is formed in a first region between the first magnetic flux plate and a first one of the at least two magnets. Alternatively or additionally, a second air gap is formed in a second region between the first magnetic flux plate and a second one of the at least two magnets. Thus, the magnetization of the initially unmagnetized permanent magnets is in particular simplified by means of a magnetization device. In this context, for example, a current-conducting conductor can be inserted into the gap as a magnetization device, which magnetizes the unmagnetized permanent magnets by means of a current pulse. Preferably, the air gap is wider than the first magnetic flux plate. In particular, the at least one air gap has a width in a range from 1.3 mm to 1.7 mm, preferably 1.5 mm, while the first magnetic flux plate has a width in a range from 0.3 mm to 0.7 mm, preferably 0.5 mm.

Preferably, according to an example embodiment of the present invention, the coil body, in particular in a plan view, frames the micromirror. Preferably, the micromirror is circular or oval. In that the coil body frames the micromirror, hardly any insulation layers and/or conductive layers for the coil body need to be mounted below the micromirror. Such insulation layers and/or conductive layers may result in residual stresses and unwanted warping of the micromirror.

Preferably, according to an example embodiment of the present invention, the micromechanical vibration system additionally comprises a coil carrier for supporting the coil body. In this case, the coil carrier extends in the first main extension plane together with the micromirror. Preferably, the coil carrier also extends laterally to the micromirror and thus frames the micromirror.

Preferably, according to an example embodiment of the present invention, the magnets are arranged relative to the coil body in such a way that the current direction in the coil body is arranged substantially perpendicularly to a stray field of magnetic field lines of the respective magnet. This makes it possible to place the magnets on the rear side of the coil, i.e., the side opposite the reflective face of the micromirror. The respective stray field preferably extends perpendicularly to the current flow direction and in the second main extension plane of the coil body.

Preferably, according to an example embodiment of the present invention, the micromirror is designed as a silicon component. The design as a silicon component results in the possibility of forming the micromirror as thin as possible. Preferably, the coil carrier and/or springs of the micromechanical vibrating body are also designed as silicon components. In this case, the entire micromechanical vibrating body preferably extends in a common main extension plane. Preferably, in this context, the entire micromechanical vibrating body is designed in one piece as a silicon component.

A further object of the present invention is to provide a microprojection device comprising the micromechanical vibration system described above. In such a microprojection device, the micromirror is used to project light, radiated from, for example, a laser unit onto the micromirror, onto a projection surface.

A further object of the present invention is to provide a method for producing a micromechanical vibration system. This is in particular the micromechanical vibration system described above. In the production method, a coil body of an electromagnetic drive unit of the micromechanical vibration system is arranged relative to a micromechanical vibrating body with at least one micromirror in such a way that the coil body is arranged in a second main extension plane parallel to a first main extension plane of the micromirror. Additionally, with respect to the micromirror, the coil body is arranged laterally and/or on a side opposite the face of the micromirror reflective to incident light and/or on a side facing the reflective face of the micromirror. Furthermore, at least two magnets are arranged in a third main extension plane parallel to the first and second main extension planes. In this case, the at least two magnets are arranged on the side of the micromirror opposite the reflective face, and spaced apart, in particular completely spaced apart, from one another. In addition, for guiding the magnetic field lines toward the coil body, a single first magnetic flux plate is arranged between the magnets. In particular, for guiding the magnetic field lines toward the coil body, the single first magnetic flux plate is arranged in an intermediate space between the magnets.

DETAILED DESCRIPTION OF EXAMPLE EMBODIMENTS

Figure 1A:
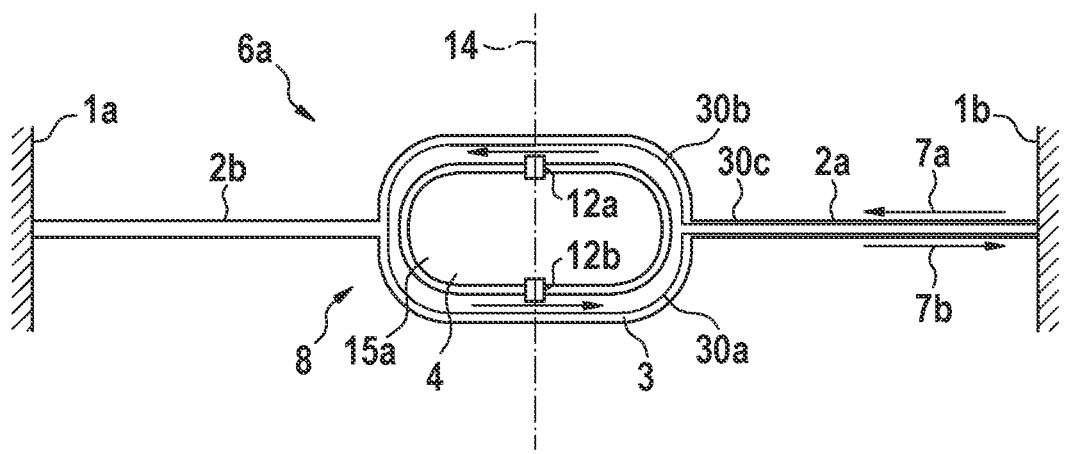
FIG. 1A shows a plan view of a first embodiment of a micromechanical vibration system, according to the present invention.

FIG. 1A shows a schematic plan view of a first embodiment of a micromechanical vibration system 6a. The plan view refers to a view that is orthogonal to the reflection plane of the micromirror 4. The micromechanical vibration system 6a comprises a micromechanical vibrating body 8 with the micromirror 4. The micromirror 4 has a surface 15a designed to be reflective to incident light. Additionally, the micromechanical vibration system 6a comprises an electromagnetic drive unit, whose coil body 30a, 30b is shown here with a supply line 30c. The coil body 30a and 30b extends completely laterally to the micromirror 4 and thus frames it. The current direction within the coil body is marked by arrows 7a and 7b.

The micromechanical vibration system 6a additionally comprises a coil carrier 3 for supporting the coil body 30a, 30b and its supply line 30c. The coil carrier 3 in turn is connected to the micromirror 4 by means of two linear bars 12a and 12b. Additionally, the micromechanical vibration system comprises two linear springs 2a and 2b for attaching the micromechanical vibrating body 8 to a frame element 1a and 1b. For electrical contacting, the supply line 30c extends on a surface along the second spring 2b. Alternatively, the linear springs 2a and 2b may also be replaced by meandering spring shapes, e.g., in order to reduce installation space or to change frequency properties.

In this embodiment, the entire micromechanical vibrating body 8 with the micromirror 4 is formed in one piece as a silicon component.

Figure 1B:
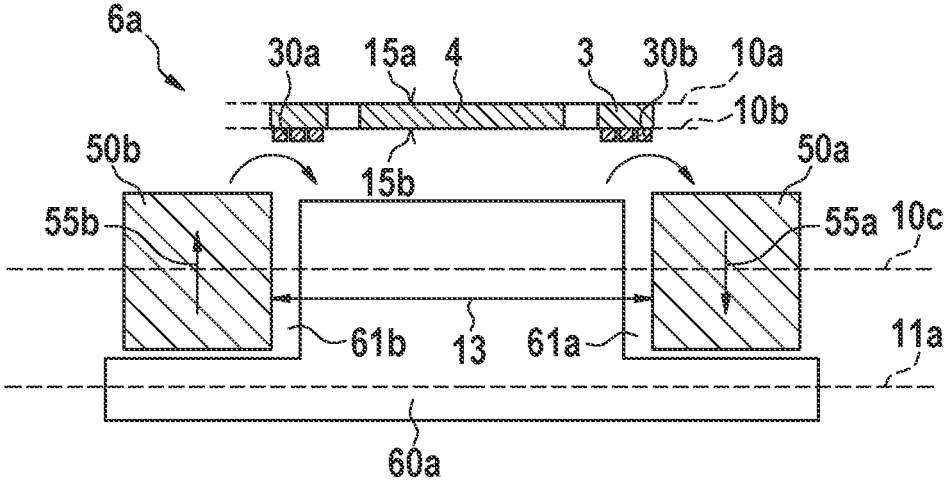
FIG. 1B shows a cross section of the first embodiment of the micromechanical vibration system.

FIG. 1B schematically shows the micromechanical vibration system 6a in a side view. The micromirror 4 extends in a first main extension plane 10a and the coil body 30a, 30b extends in a second main extension plane 10b parallel to the first main extension plane 10a. The electromagnetic drive unit of the micromechanical vibrating body 6a in this exemplary embodiment comprises two magnets 50a and 50b, which have a distance 13 from one another and are thus arranged spaced apart from one another. The two magnets 50a and 50b are arranged on the side 15b of the micromirror 4 opposite the reflective face 15a of the micromirror 4 and extend in a third main extension plane 10c parallel to the first 10a and the second main extension plane 10b. For guiding the magnetic field lines 55a and 55b toward the coil body 30a and 30b, a single first magnetic flux plate 60a is arranged in the intermediate space between the magnets 50a and 50b.

The first magnetic flux plate 60a, which is T-shaped in this exemplary embodiment, extends at least partially in a first partial extension plane 11a which is parallel to the main extension planes 10a, 10b, and 10c and extends on the side 15b of the micromirror 4 opposite the reflective face 15a of the micromirror 4. The first partial extension plane 11 is arranged in the side view below the magnets 50a and 50b. A first air gap 61a is formed in a first region between the first magnetic flux plate 60a and a first one 50a of the at least two magnets 50a and 50b. A second air gap 61b is formed in a second region between the first magnetic flux plate 60a and a second one 50b of the at least two magnets 50a and 50b. The air gaps 61a and 61b serve to magnetize the initially unmagnetized permanent magnets by means of a magnetization device not shown here.

The magnets 50a and 50b are arranged relative to the coil body 30a and 30b in such a way that the current direction in the coil body 30a and 30b is arranged substantially perpendicularly to a stray field of magnetic field lines 55a and 55b of the respective magnet 50a and 50b.

Figure 2A:
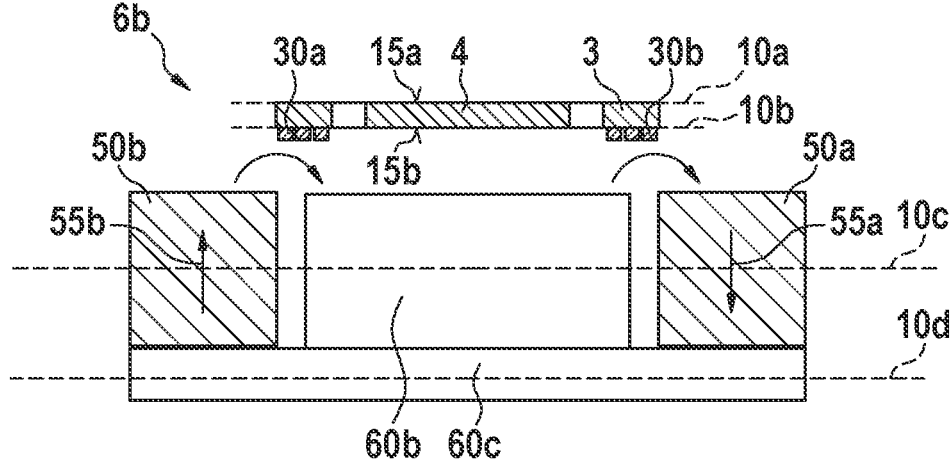
FIG. 2A shows a cross section of a second embodiment of the micromechanical vibration system, according to the present invention.

FIG. 2A shows a side view of a second exemplary embodiment of a micromechanical vibration system 6b. Here, the micromechanical vibration system 6b additionally comprises a second magnetic flux plate 60c, which extends in a fourth main extension plane 10d parallel to the main extension planes 10a, 10b and 10c. The second magnetic flux plate 60c is arranged on the side 15b of the micromirror 4 opposite the reflective face 15a of the micromirror 4. In this embodiment, the first magnetic flux plate 60b extends in the third main extension plane 10c of the magnets 50a and 50b and is connected to the second magnetic flux plate 60c by means of an adhesive not shown here. Alternatively or additionally, a small plate or spacer not shown here is arranged between the first magnetic flux plate 60b and the second magnetic flux plate 60c. This also results overall in a T-shaped magnetic flux plate here, which is composed of the first magnetic flux plate 60b and the second magnetic flux plate 60c.

Figure 2B:
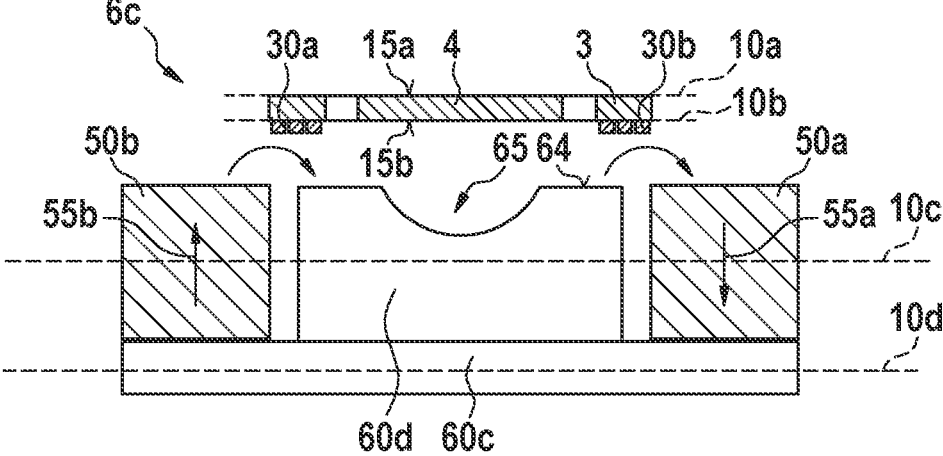
FIG. 2B shows a cross section of a third embodiment of the micromechanical vibration system, according to the present invention.

FIG. 2B shows a side view of a third exemplary embodiment of a micromechanical vibration system 6c. In this case, in contrast to the above-described exemplary embodiments, the first magnetic flux plate 60d has a semi-circular recess 65 in a side face 64 arranged closest to the micromirror 4.

Figure 2C:
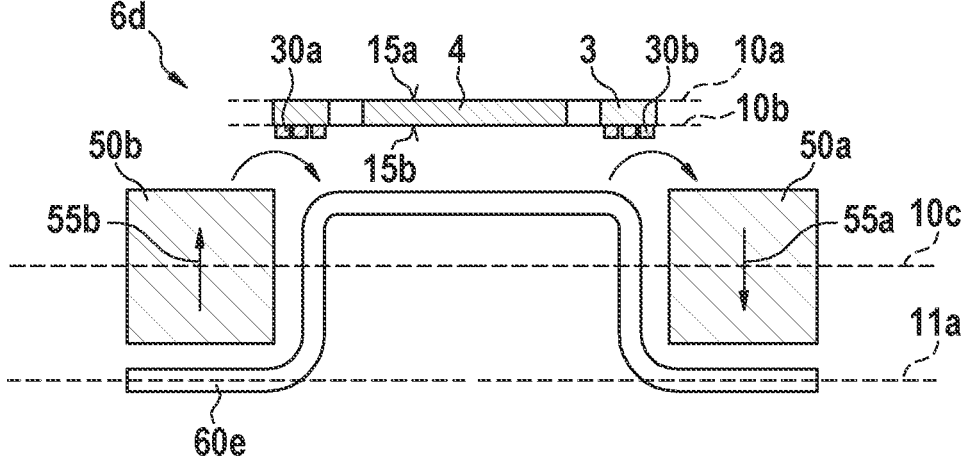
FIG. 2C shows a cross section of a fourth embodiment of the micromechanical vibration system, according to the present invention.

FIG. 2C shows a side view of a fourth exemplary embodiment of a micromechanical vibration system 6d. In this case, in contrast to the above-described exemplary embodiment, the first magnetic flux plate 60e is curved. In this exemplary embodiment, the first magnetic flux plate 60e is Q-shaped.

Figure 3:
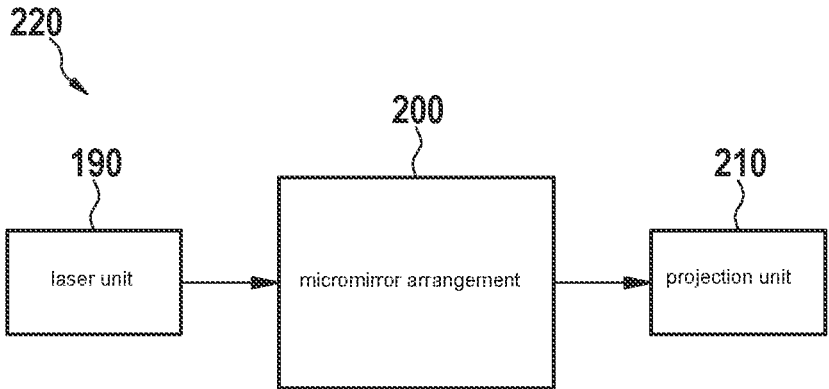
FIG. 3 schematically shows a microprojection device comprising a micromechanical vibration system.

FIG. 3 schematically shows, by way of example, a microprojection device 220 comprising a micromirror arrangement 200 as a micromechanical vibration system. In addition to the micromirror arrangement 200, such a microprojection device comprises a laser unit 190 as an illumination unit, which is designed to radiate light of at least one wavelength onto the micromirror arrangement 200. The micromirror arrangement 200 in turn is designed to deflect the light of at least one wavelength onto a projection unit 210, in particular a display or a retina, depending on a deflection of the micromirror of the micromirror arrangement 200.

Figure 4:
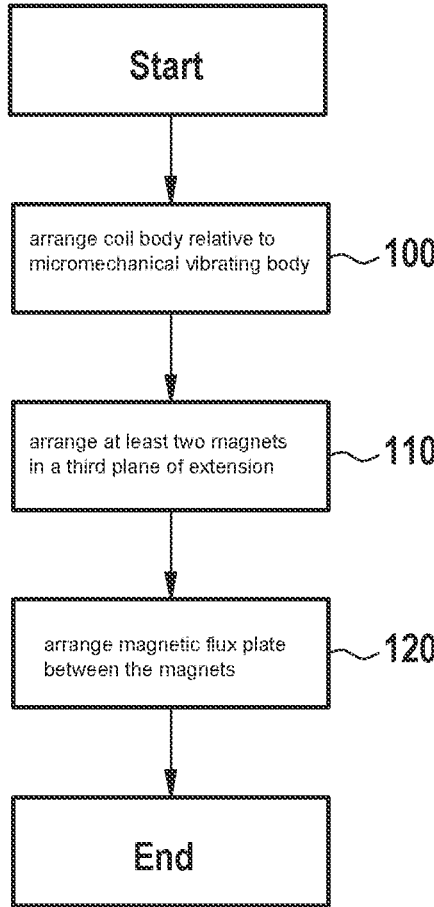
FIG. 4 shows a method for producing a micromechanical vibration system.

FIG. 4 shows a method for producing a micromechanical vibration system in the form of a flow chart. In a method step 100, a coil body of an electromagnetic drive unit of the micromechanical vibration system is arranged relative to a micromechanical vibrating body with at least one micromirror in such a way that the coil body is arranged in a second main extension plane parallel to a first main extension plane of the micromirror. With respect to the micromirror, the coil body is arranged laterally and/or on a side opposite the face of the micromirror reflective to incident light and/or on a side facing the reflective face of the micromirror. In a following method step 110, at least two magnets are arranged in a third main extension plane parallel to the first and second main extension planes. The at least two magnets are arranged on the side opposite the reflective face of the micromirror and spaced apart, in particular completely spaced apart, from one another. In a method step 120, for guiding the magnetic field lines toward the coil body, a single first magnetic flux plate is arranged between the magnets, in particular in an intermediate space. Thereafter, the method ends.

What is claimed is:

1. A micromechanical vibration system, comprising:
   a micromechanical vibrating body including at least one micromirror, wherein the micromirror extends in a first main extension plane and has a face reflective to incident light; and
   an electromagnetic drive unit including a coil body and at least two magnets, wherein the coil body is arranged in a second main extension plane parallel to the first main extension plane and is arranged with respect to the micromirror laterally and/or on a side opposite the reflective face of the micromirror and/or on a side facing the reflective face of the micromirror, wherein the at least two magnets extend in a third main extension plane parallel to the first and the second main extension plane, wherein the at least two magnets are arranged on the side opposite the reflective face of the micromirror, and the at least two magnets are arranged completely spaced apart from one another, and the electromagnetic drive unit further including a single first magnetic flux plate configured to guide the magnetic field lines toward the coil body, and arranged between the magnets in an intermediate space,
   wherein at least one air gap is formed between the first magnetic flux plate and each of the at least two magnets, the air gaps configured to facilitate magnetization of initially unmagnetized permanent magnets.

2. The micromechanical vibration system according to claim 1, wherein the first magnetic flux plate additionally extends at least partially in a first partial extension plane parallel to the first, second, and third main extension planes, wherein the first partial extension plane extends on the side of the micromirror opposite the reflective face of the micromirror.

3. The micromechanical vibration system according to claim 1, further comprising:
   a second magnetic flux plate which extends in a fourth main extension plane parallel to the first, second, and third main extension planes, wherein the fourth main extension plane extends on the side of the micromirror opposite the reflective face of the micromirror, and the first magnetic flux plate is connected to the second magnetic flux plate.

4. The micromechanical vibration system according to claim 2, wherein the first magnetic flux plate and/or the second magnetic flux plate has a T-shaped cross section.

5. The micromechanical vibration system according to claim 1, wherein the first magnetic flux plate has a semi-circular recess in a side face arranged closest to the micromirror.

6. The micromechanical vibration system according to claim 1, wherein the first magnetic flux plate is at least partially curved.

7. The micromechanical vibration system according to claim 1, wherein a first air gap is formed in a first region between the first magnetic flux plate and a first one of the at least two magnets and/or a second air gap is formed in a second region between the first magnetic flux plate and a second one of the at least two magnets.

8. The micromechanical vibration system according to claim 1, wherein the coil body frames the micromirror in a plan view.

9. The micromechanical vibration system according to claim 1, further comprising:

a coil carrier supporting the coil body, wherein the coil carrier extends in the first main extension plane together with the micromirror.

10. The micromechanical vibration system according to claim 1, wherein each of the magnets are arranged relative to the coil body in such a way that a current direction in the coil body is arranged substantially perpendicularly to a stray field of magnetic field lines of the respective magnet.

11. The micromechanical vibration system according to claim 1, wherein the micromirror is a silicon component.

12. A microprojection device, comprising:

a micromechanical vibration system, including:

a micromechanical vibrating body including at least one micromirror, wherein the micromirror extends in a first main extension plane and has a face reflective to incident light; and an electromagnetic drive unit including a coil body and at least two magnets, wherein the coil body is arranged in a second main extension plane parallel to the first main extension plane and is arranged with respect to the micromirror laterally and/or on a side opposite the reflective face of the micromirror and/or on a side facing the reflective face of the micromirror, wherein the at least two magnets extend in a third main extension plane parallel to the first and the second main extension plane, wherein the at least two magnets are arranged on the side opposite the reflective face of the micromirror, and the at least two magnets are arranged completely spaced apart from one another, and the electromagnetic drive unit further includes a single first magnetic flux plate configured to guide the magnetic field lines toward the coil body, and arranged between the magnets in an intermediate space, wherein at least one air gap is formed between the first magnetic flux plate and each of the at least two magnets, the air gaps configured to facilitate magnetization of initially unmagnetized permanent magnets.

13. A method for producing a micromechanical vibration system, comprising the following steps:

arranging a coil body of an electromagnetic drive unit of the micromechanical vibration system relative to a micromechanical vibrating body with at least one micromirror in such a way that the coil body is arranged in a second main extension plane parallel to a first main extension plane of the micromirror and is arranged with respect to the micromirror laterally and/or on a side opposite a face of the micromirror reflective to incident light and/or on a side facing the reflective face of the micromirror;

arranging at least two magnets in a third main extension plane parallel to the first and the second main extension plane, wherein the at least two magnets are arranged on a side opposite the reflective face of the micromirror and are arranged completely spaced apart from one another; and arranging a single first magnetic flux plate, for guiding the magnetic field lines toward the coil body, between the magnets in an intermediate space, wherein at least one air gap is formed between the first magnetic flux plate and each of the at least two magnets, the air gaps configured to facilitate magnetization of initially unmagnetized permanent magnets.

* * * * *